(12) United States Patent
Torkamani et al.

(10) Patent No.: US 11,743,282 B1
(45) Date of Patent: Aug. 29, 2023

(54) ENHANCED CLOUD-BASED ENTITY REPUTATION SCORING

(71) Applicant: Amazon Technologies, Inc., Seattle, WA (US)

(72) Inventors: MohamadAli Torkamani, Scarsdale, NY (US); Baris Coskun, Glen Rock, NJ (US); Jeffrey Earl Bickford, Thornton, CO (US); Shane Anil Pereira, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 17/031,776

(22) Filed: Sep. 24, 2020

(51) Int. Cl.
*H04L 9/40* (2022.01)
*G06N 20/00* (2019.01)
*H04L 61/4511* (2022.01)
*H04L 67/1001* (2022.01)
*G06F 18/211* (2023.01)
*G06N 5/01* (2023.01)

(52) U.S. Cl.
CPC ........ *H04L 63/1433* (2013.01); *G06F 18/211* (2023.01); *G06N 5/01* (2023.01); *G06N 20/00* (2019.01); *H04L 61/4511* (2022.05); *H04L 63/0227* (2013.01); *H04L 63/1441* (2013.01); *H04L 67/1001* (2022.05)

(58) Field of Classification Search
CPC ............. H04L 63/1433; H04L 61/4511; H04L 67/1001; H04L 63/0227; H04L 63/1441; G06N 20/00; G06N 5/003; G06K 9/6228
See application file for complete search history.

(56) References Cited

U.S. PATENT DOCUMENTS

| 7,475,118 B2* | 1/2009 | Lei ................... G06Q 10/107 709/224 |
| 11,122,063 B2* | 9/2021 | DiValentin .......... H04L 63/1416 |
| 11,411,998 B2* | 8/2022 | Sundaram ........... H04L 63/0227 |
| 2011/0041132 A1* | 2/2011 | Andrade ............... G06F 9/5083 718/102 |
| 2016/0065597 A1* | 3/2016 | Nguyen .............. H04L 63/1441 726/22 |
| 2018/0183940 A1* | 6/2018 | Kosseifi .............. H04M 15/885 |
| 2021/0018881 A1* | 1/2021 | Rezgui ..................... G06N 5/01 |
| 2021/0398172 A1* | 12/2021 | Reding ................. G06N 3/084 |

* cited by examiner

*Primary Examiner* — Shin-Hon (Eric) Chen
*Assistant Examiner* — Saad Ahmad Abdullah
(74) *Attorney, Agent, or Firm* — Eversheds Sutherland (US) LLP

(57) ABSTRACT

Devices, systems, and methods are provided for cloud-based entity reputation scoring. A method may include determining, based on domain name service (DNS) data associated with entities of the cloud-based environment, a k-partite graph with nodes and edges, a node including a first elastic computing instance. The method may include generating features associated with the first elastic computing instance. The method may include determining, based on the features, a minimum value, a maximum value, and an average value, and generating a feature vector comprising the minimum value, the maximum value, and the average value. The method may include determining, based on the feature vector, a reputation score associated with the first elastic computing instance. The method may include communicating based on the reputation score.

20 Claims, 7 Drawing Sheets

US 11,743,282 B1

ENHANCED CLOUD-BASED ENTITY REPUTATION SCORING

BACKGROUND

People increasingly are using cloud-based networks. Some accessible entities, such as domains, may be malicious. However, protecting resources in a cloud-based network may be inefficient and unreliable. Enhanced security protection therefore may be desirable.

Figure 1:
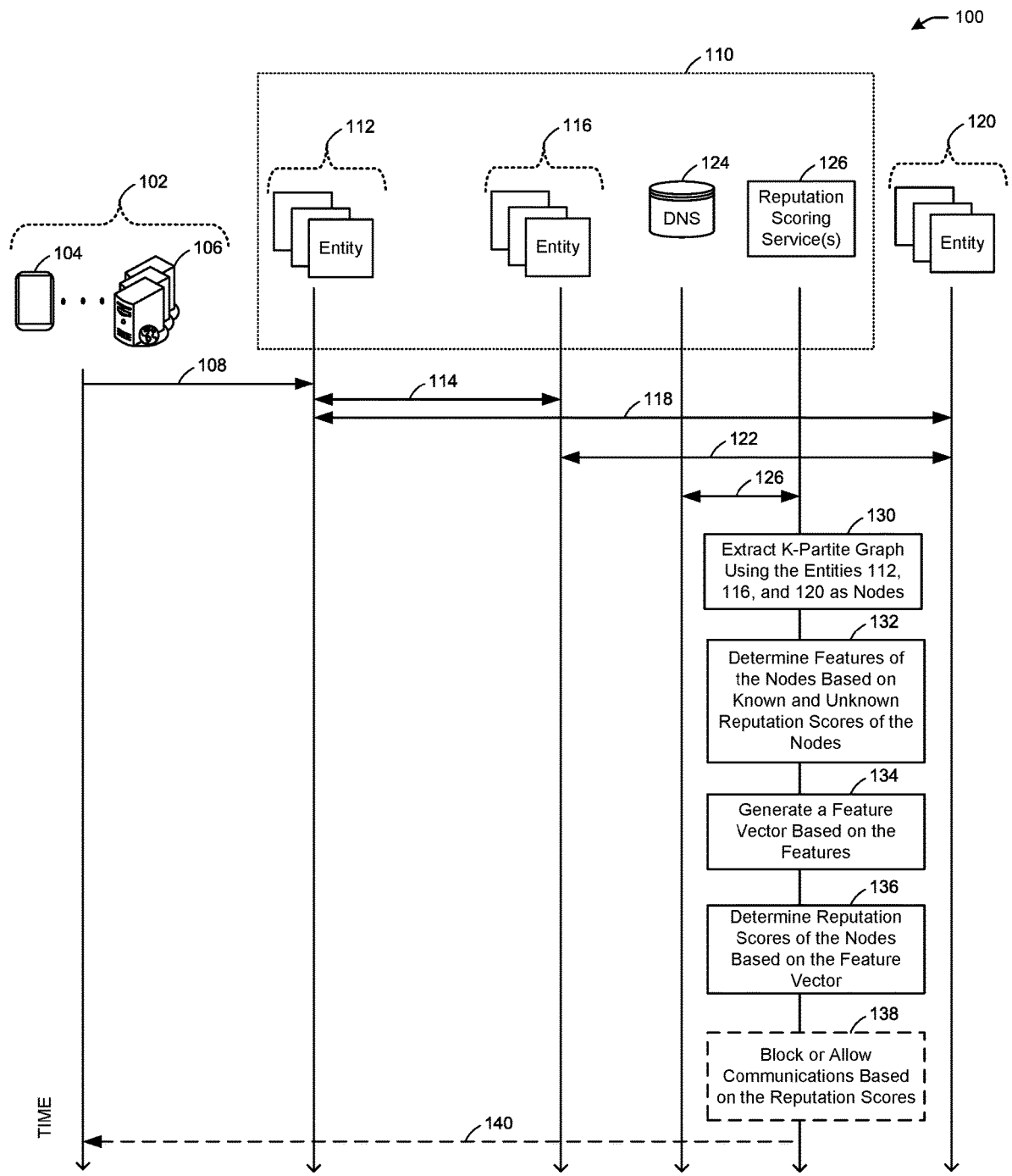
FIG. 1 illustrates an example process for cloud-based entity reputation scoring, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for cloud-based entity reputation scoring.

Cloud-based network users may use cloud-based infrastructure, such as serverless computing, elastic computing, and other resources (e.g., as described further herein) to perform tasks (e.g., reading from, writing to, etc.). Some usage of cloud-based resources may be malicious. For example, a user may generate an elastic computing instance in a cloud-based environment to query a malicious domain name. To protect cloud-based resources from malicious use, a cloud-based infrastructure may rely on domain name system (DNS) data.

DNS queries and responses may be used to match domain names to addresses (e.g., Internet Protocol—IP—addresses). For example, when a user enters a uniform resource locator (URL) of www.domainname.com to be accessed by a cloud-based computing resource, the cloud-based environment may determine whether the domain and/or associated IP address is included in a list of malicious domain names/addresses before determining whether to allow or block/prevent access to the domain/address.

However, malicious domain names may be determined and provided by third parties (e.g., external to the cloud-based environment). Therefore, the ability of a cloud-based environment to detect malicious behavior may depend on whether another party or service already has determined that a domain/address is malicious rather than predicting malicious domains/addresses before they may be identified and reported by a third party.

In addition, malicious behavior for cloud-based environments may not be limited to malicious domains/IP addresses. For example, cloud-based environment accounts, elastic computing instances, serverless computing instances (e.g., generated only for the duration required to perform one or more tasks, and then torn down), certificate authorities, and other types of entities of a cloud-based environment (e.g., other than DNS) may be considered malicious. In particular, an instance that communicates with a malicious domain also may communicate with other domains, so the instance and/or any accounts using the instance may be considered malicious. Using DNS query logs for an instance may reveal that the instance queried a domain considered malicious, for example.

Some legitimate (e.g., non-malicious) entities may be compromised (e.g., malicious) for short times, and used non-maliciously for other times. For example, a domain may be malicious temporarily, and listed as malicious accordingly, but then blocked later once the domain is no longer malicious. An instance may query a malicious domain, but also may query a non-malicious domain. In this manner, relying on DNS data and third party reporting of malicious domains may not be timely, and may result in false positives.

Machine learning techniques may be used to identify malicious cloud-based environment entities. However, some machine learning techniques may not be scalable to detect malicious activity in cloud-based environments with many (e.g., billions) of entities. Some machine learning techniques may be limited in detection capabilities based on training data, and may not detect malicious entities that were not used in machine learning training. For example, some existing techniques may apply a neural network to a bi-partite DNS graph, but may not scale to a k-partite graph with billions of entities and trillions of edges.

Cloud-based environment entities may be represented by a k-partite graph due to a k-partite nature of network entities, such as DNS. In particular, the translation of domain names to IP addresses may result in a graph-like association between domains and addresses. When activity in a cloud-based environment is represented by a k-partite graph (e.g., with entities being nodes, and edges between the nodes, such as domains/addresses queried by instances, accounts used by the instances, etc.), training of machine learning models to identify malicious behavior with minimal false positives may be inefficient. In addition, some k-partite graphs may not scale to include cloud-based environment entities other than DNS data.

Therefore, there is a need for enhanced detection of malicious entities in a cloud-based environment.

In one or more embodiments, a cloud-based environment may include highly scalable techniques for determining the reputation of internet-based and cloud-based entities, such as domain names, elastic computing instances, IP addresses, certificate authorities, and the like using data that the cloud-based environment already collects (e.g., instead of relying exclusively on external data, such as lists of malicious domains). For example, not only may a domain and its address be evaluated for malicious behavior, but instances that query the domain may be evaluated. A system for the cloud-based environment may scale to large k-partite graphs with billions of nodes and trillions of edges, for example. One technique may include a simplified k-partite graph convolution method that is tailored to minimize the number of false positives when detecting malicious entities. The technique may extract a set of highly informative and robust features from the graph, and may train a machine learning classifier on the features using a small set of known malicious and benign entities. As part of feature extraction process, the technique may propagate entity reputations from known malicious and benign entities to other entities on the graph, hence assigning reputation to any of the entities.

In one or more embodiments, the k-partite graph may include multiple types of edges, such as edges between domains and the IP addresses to which the domains have resolved, edges between elastic computing instances and domains that the instances have queried, edges between elastic computing instances and cloud-based environment with which accounts the instances are associated, and the like. Empirical results confirm the system's ability to predict malicious domain names before they are reported in any third party sources. The system may produce a high-quality list of previously unknown malicious domains with almost no false positives using conservative thresholds. The algorithms may reduce reliance on third parties for detecting emerging threats, and instead may generate knowledge produced by data from within the cloud-based environment. The techniques may be extended to generate reputation scores for IP Addresses, elastic computing instances, and cloud-based environment accounts, for example. The system may use features that span the spatial connectivity of the graph as well as temporal behavior over a specified time period.

In one or more embodiments, the system may expand the k-partite graph to other entities such as flow logs, security certificate authorities, malware detonation pipelines, and more. By extending to new data types other than DNS, the system may determine reputation scores for other entities in the cloud-based environment. For example, the system may be able to identify that all executable binaries from a specific domain should be considered malicious, or all domains with a certain security certificate are related.

In one or more embodiments, the system may use one or more techniques to determine a probability of a cloud-based environment entity being malicious. For example, one technique may include a semi-supervised graph convolution method with minimal parameters and features tailored to minimize the number of false positives when identifying malicious entities (e.g., a trust-based technique). Another technique may learn embeddings for any domain name using a ranking-based energy function. The techniques may allow for identifying malicious entities that were not used in machine learning training, and may detect threats before they are used/invoked. The system may generate a confidence list of domain names and other entities indicating the probability of any entity being malicious, and allowing a cloud-based environment to allow or block/prevent access to domains and other entities based on the probabilities.

In one or more embodiments, the system may use the trust-based technique (e.g., a trust-based simplified graph convolution neural network) and the energy-based technique (e.g., energy-based knowledge graph embedding) independently and in parallel. Both techniques may convert a neural network's inference and parameter learning operations into functions distributed across an elastic mapping cluster of the cloud-based environment. For the trust-based simplified graph convolution neural network, the system may train a regression model on a prediction layer. For the energy-based knowledge graph embedding technique, the system may train embedding vectors in an unsupervised manner. A multilayer perceptron may be trained on top of the embeddings using known labels, for example. The system may perform graph extraction, one or both of the techniques, then a logistic regression prediction for the trust-based simplified graph convolution neural network and/or a feed forward multilayer perceptron for the energy-based knowledge graph embedding technique.

In one or more embodiments, the system may consider DNS log data of elastic computing machines of the cloud-based environment for a period of time (e.g., one week or another time). In particular, the cloud-based environment may allow users to temporarily use virtual computers on which to execute applications. The virtual machine, or instance, that may be generated to execute applications may be considered an elastic computing instance because a user may launch and tear down the instances as needed. Any DNS queries by an elastic computing instance may be stored in DNS logs accessible to the system along with identifiers of the specific instances used to perform the queries. The system may remove DNS records where no domain name is present, where no response is received for a query, where the query is rejected, and/or when an instance does not have an identifier (e.g., to reduce the large data size to be analyzed). The system may determine from any query a subdomain, second-level domain, and top-level domain of the query. The top-level domain may refer to public suffixes such as .com, .co, .uk, etc. The second-level domain may refer to the level after the top-level domain. The subdomain may refer to the concatenation of any level after the second-level domain. For example, duck.111.com.cn may have "duck" as the subdomain, "111" as the second-level domain, and "com.cn" the top-level domain.

In one or more embodiments, the system may extract a k-partite graph from the DNS data, with different types of nodes, such as elastic computing instances (e.g., a unique identifier of an instance that queried a domain), a fully qualified domain name (FQDN, referring to a tuple of the subdomain, second-level domain, and top-level domain that was queried by the instance), a second-level domain and top-level domain pair (e.g., tuple), and IP address in a DNS query response that resolves to the domain. Based on the nodes, the edges of the k-partite graph may include edges between elastic computing instances and a FQDN queried by the instance, edges between a FQDN and an IP address when the FQDN resolved to the IP address, and edges between FQDNs and their pairs of second-level and top-level domains. The k-partite graph may be spatio-temporal in that it may include data for multiple days of cloud-based environment use from multiple regions.

In one or more embodiments, the trust propagation technique may use the spatio-temporal behavior of elastic computing instances and IP addresses based on their connections to previously known domains. For example, when an elastic computing instance has never queried a known malicious domain, and mostly has queried known legitimate domains, it may be more likely than not that other domains queried by the instance may be legitimate. The opposite may be true for instances that mostly query malicious domains. In this manner, one domain may be determined to be malicious (e.g., with a confidence score) based on the other domains queried by the instance that queried the domain. The result may be a semi-supervised message passing method and a max pooling step. The semi-supervised message passing method may include initialization in which the system uses known training labels for initial reputations encoded as +1 for known malicious domains and encoded as −1 for known non-malicious domains. The semi-supervised message passing method may include belief propagation in which any FQDN may send its reputation to connected nodes in the side partites (e.g., IP, elastic computing instance and second-level domain). The semi-supervised message passing method may include a gather reputation step in which side partite nodes aggregate messages and generate features. The adjusted pooling step may include FQDN partites collecting pooled statistics as stacked features.

Some graph neural networks rely on deep multi-layer structures with nonlinear activation functions to extract feature vectors for a prediction layer. However, scaling some existing graph neural network techniques to k-partite graphs with billions of nodes may require so much time that predictions of whether nodes are malicious may be outdated by the time the predictions are available. In one or more embodiments, the trust propagation technique may scale to such large k-partite graphs. In particular, in the gather reputation step described above, the system may generate a histogram of neighboring labels for any and all nodes, indicating the number of known malicious ("#bad") domains, known non-malicious ("#good") domains, and the number of unknown ("#unknown") domains. Being connected to a malicious domain may contribute negatively to an entity's reputation score. Because some entities, such as elastic computing instance machines, may serve as proxy servers for cloud-based environment users and may query many good, bad, and unknown domains, the system may generate multiple sets of heuristic features that may indicate an entity's reputation.

In one or more embodiments, a first heuristic feature may include a weighted average of known good and bad counts (referred to as "linear reputation"). When a node such as an elastic computing instance has no bad neighbors, the node's linear reputation may be set to −1, and may be set to +1 when the node has no good neighbors. A coefficient α may be a coarsely tuned hyper-parameter that reflects the imbalance of connections to both good and bad domains. Using α, the linear reputation $r_{lin}$ may be represented by:

$$r_{lin} = \frac{(\alpha \times \#bad - \#good)}{(\alpha \times \#bad + \#good)}.$$

Because a single bad domain may indicate an attack, associations with bad domains may significantly outweigh associations with good domains. A second heuristic—exponential reputation ($r_{exp}$)—addresses this issue:

$$r_{exp} = \frac{(\#bad - \log(\#good))}{(\#bad + \log(\#good))}.$$

Many domains may not be labeled and may be assumed to be non-malicious, so when a node is connected to many unknown domains, the node may be considered non-malicious. Therefore, a third heuristic feature may be a regularized linear reputation ($r_{linReg}$), and a fourth heuristic feature may be a regularlized exponential reputation ($r_{expReg}$), where:

$$r_{linReg} = \frac{(\alpha \times \#bad - \#good - \#\log(\#unknown))}{(\alpha \times \#bad + \#good + \log(\#unknown)))} \text{ and}$$

$$r_{expReg} = \frac{(\#bad - \log(\#good) - \log(\#unknown))}{(\#bad + \log(\#good) + (\log(\#unknown))}.$$

In one or more embodiments, a FQDN partite of the k-partite graph separately may collect the numbers of #good, #bad, and #unknown domains, as well as the heuristic features $r_{lin}$, $r_{exp}$, $r_{linReg}$, and $r_{expReg}$ of any entities and second-level domain partites. In the pooling step described above, the system may determine a minimum value, maximum value, and average value of each of the above variables for any entity or second-level domain. The system also may collect the sum of the heuristic features $r_{lin}$, $r_{exp}$, $r_{linReg}$, and $r_{expReg}$ of any entities and second-level domain partites. The system may stack the pooled features from any partite as a single feature vector. Because label information may be used to generate the features, for FQDNs with known labels, a value of one may be subtracted from the #bad or from the #good in the pooled minimum, maximum, and average values. Some convolutional neural networks may requiring learning all features, so in this manner, the system may save time by using the limited set of features described above.

In one or more embodiments, the system may use graph embedding. The extracted graph described above may be heterogeneous, and the edges between nodes may represent different meanings and types of relationships between the nodes. Therefore, nodes with different labels may be embedded far away from one another (e.g., more than a threshold distance). Nodes that are neighbors in the graph therefore may be similar to one another, and nodes that are not neighbors (e.g., are separated by a threshold distance) may not have a similar embedding. To achieve such embedding, a joint loss function maybe used. However, two issues may occur. One issue may be that the size of the graph is too large to train in a timely manner. Another issue may be that malicious entities may query so many good domains to disguise themselves as non-malicious. To address the size issue, the system may learn the embeddings without supervision, using an energy-based model, for example. The system may learn a classification model on top of learned embeddings. To address the disguise issue, the system may control the effect of any node on its neighboring nodes by weighting a contribution.

In one or more embodiments, the energy-based embedding technique may learn embeddings in a manner that maximizes an energy function over the cloud-based environment. For example, let G=(V,E) be the graph, where V is the set of vertices and E is the set of edges. The energy may be decomposable for any node in the graph: Energy(G) $=\Sigma_{v_i \in V} \Box score(v_i)$. A scoring function such as the following may be used: $Score(v) = \mathbb{E}[sim(v_i,v_j)|v_j \in N(v_i)] - \mathbb{E}[\max(0,sim(v_i,v_j)+\lambda)|v_j \in N(v_i)]$. The similarity function may be the cosine similarity between two vectors that is discounted by the geographic mean of fan-out and fan-in of sender and receiver nodes of the graph:

$$\text{sim}(v_i, v_j) = \alpha_{ij} v_i^T v_j, \text{ and } \alpha_{ij} = \frac{1}{\sqrt{\deg(v_i)\deg(v_i)}}.$$

The discounting factor $\alpha_{ij}$ may be a heuristic coefficient based on the degrees of $v_i$ and $v_j$ in the graph. As a result of downscaling, when a node is connected to many other nodes, the contribution of any edge between node and the other nodes in the total energy of the cloud-based environment may be less than the edges of a node with a lower degree. The scoring function above may result in a simplified rank-based energy function. When $\text{sim}(v_i,v_j)$ is high on average (e.g., above a threshold) for $v_j$'s in the neighborhood of a node, the node may be similar to its neighboring nodes. On the negative side of the scoring function, $\max(0,\text{sim}(v_i,v_j)+\lambda)$ may dictate that a node should not be similar to its non-neighboring nodes. For example, when $\lambda=0$, embeddings of disconnected vertices may not be penalized as long as they are perpendicular or are not aligned with one another (e.g., $\text{sim}(v_i,v_j)=0$). However, $\lambda=1$ may penalize embeddings of disconnected vertices unless two embedding vectors point in opposite directions. For efficient negative sampling, the system randomly may draw nodes from any and all partites of the graph. Instead of drawing negative samples for existing edges, the negative sampling may generate a random integer for any sample.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for cloud-based entity reputation scoring, in accordance with one or more example embodiments of the present disclosure.

Referring to FIG. 1, the process 100 may include devices 102 (e.g., device 104, device 106) which may send communications 108 (e.g., application programming interface calls, requests, etc.) to a cloud-based environment 110. In particular, the communications 108 may be to/for one or more entities 112 of the cloud-based environment 110. For example, the communications 108 may result in the instantiation of instances (e.g., elastic computing instances, serverless computing instances, etc.) of the one or more entities 112. Execution of tasks by the one or more entities 112, such as communications 114 with other entities 116 of the cloud-based environment 110, communications 118 from the one or more entities 112 to entities 120 external to the cloud-based environment 110 (e.g., queries to domains external to the cloud-based environment 110, such as Internet domains or other external domains), and/or communications 122 from the one or more entities 116 to the entities 120 external to the cloud-based environment 110 may be documented in data storage 124 (e.g., as DNS data representing DNS queries/responses associated with the communications 108, the communications 114, the communications 118, and/or the communications 122).

Still referring to FIG. 1, one or more reputation scoring services 126 may determine reputation scores of the one or more entities 112, the entities 116, and the entities 120, the reputation scores indicative of a likelihood of any entity being malicious. The one or more reputation scoring services 126 may request and receive data from the data storage 124 (e.g., DNS data, flow log data, security certificates, malware detonation pipeline data, etc.), and at step 130 may extract a k-partite graph using the entities 112, 116, and 120 as nodes, with edges between the nodes. At step 132, the one or more reputation scoring services 126 may determine features of the nodes based on known good reputation scores, known bad reputation scores, and unknown reputation scores of the nodes. At step 134, the one or more reputation scoring services 126 may generate a feature vector based on the features. At step 136, the one or more reputation scoring services 126 may determine reputation scores for the nodes (e.g., the entities 112, 116, and 120). Based on the reputation scores, at step 138 the cloud-based environment 110 optionally may block or allow communications with/using the entities 112, 116, and 120. At step 140, the cloud-based environment 110 optionally may alert/warn users of possibly malicious entities. The system may use a logistical regression for the vector to determine the reputation scores. The reputation score may represent a probability of the node/entity being malicious, and the system may compare the score (e.g., probability) to a threshold score. When the score satisfies the threshold (e.g., exceeds or fails to exceed), the system may label the entity/node as malicious. Otherwise, the system may label the entity/node as non-malicious.

Figure 2:
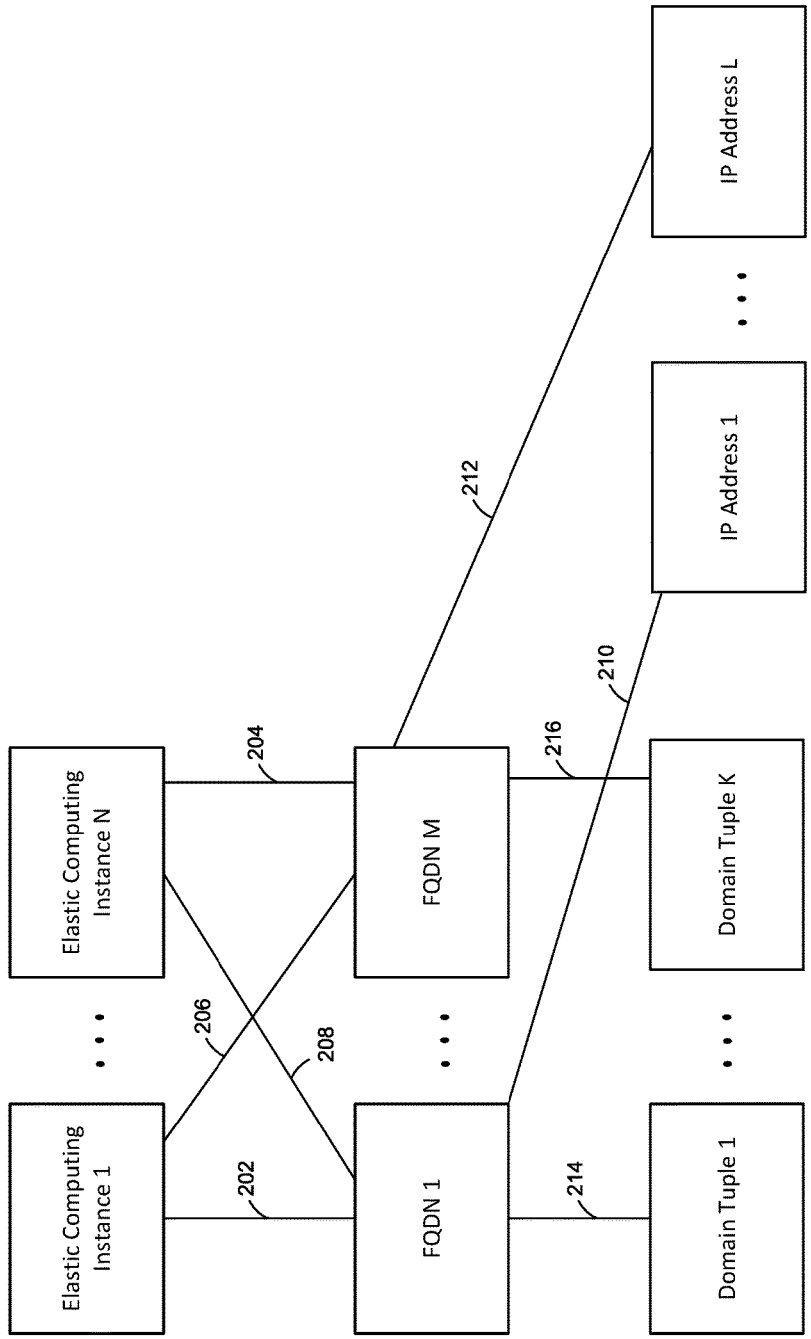
FIG. 2 illustrates an example k-partite graph for cloud-based entity reputation scoring, in accordance with one or more example embodiments of the present disclosure.

In one or more embodiments, as shown in FIG. 2, the k-partite graph extracted at step 130 may include multiple types of edges, such as edges between domains and IP addresses to which the domains have resolved, edges between elastic computing instances and domains that the instances have queried, edges between FQDNs and their pairs of second-level domains and top-level domains, edges between elastic computing instances and cloud-based environment with which accounts the instances are associated, and the like. By extending to new data types other than DNS, the one or more reputation scoring services 126 may determine reputation scores for other entities in the cloud-based environment 110. For example, the one or more reputation scoring services 126 may be able to identify that all executable binaries from a specific domain should be considered malicious, or all domains with a certain security certificate are related.

In one or more embodiments, the one or more reputation scoring services 126 may use one or more techniques to determine a probability of a cloud-based environment entity being malicious. For example, one technique may include a semi-supervised graph convolution method with minimal parameters and features tailored to minimize the number of false positives when identifying malicious entities (e.g., a trust-based technique). Another technique may learn embeddings for any domain name using a ranking-based energy function. The techniques may allow for identifying malicious entities that were not used in machine learning training, and may detect threats before they are used/invoked. The one or more reputation scoring services 126 may generate a confidence list of domain names and other entities indicating the probability of any entity being malicious, and allowing the cloud-based environment 110 to allow or block access to domains and other entities based on the probabilities.

In one or more embodiments, the one or more reputation scoring services 126 may use the trust-based technique (e.g., a trust-based simplified graph convolution neural network) and the energy-based technique (e.g., energy-based knowledge graph embedding) independently and in parallel. Both techniques may convert a neural network's inference and parameter learning operations into functions distributed across an elastic mapping cluster of the cloud-based environment 110. For the trust-based simplified graph convolution neural network, the one or more reputation scoring services 126 may train a regression model on a prediction layer (e.g., the one or more reputation scoring services 126 may use machine learning models). For the energy-based knowledge graph embedding technique, the one or more reputation scoring services 126 may train embedding vectors in an unsupervised manner. A multilayer perceptron may be trained on top of the embeddings using known labels, for example. The one or more reputation scoring services 126 may perform graph extraction, one or both of the techniques, then a logistic regression prediction for the trust-based simplified graph convolution neural network and/or a feed forward multilayer perceptron for the energy-based knowledge graph embedding technique.

In one or more embodiments, the one or more reputation scoring services 126 may consider DNS log data of elastic computing machines of the cloud-based environment 110 for a period of time (e.g., one week or another time). In particular, the cloud-based environment 110 may allow users to temporarily use virtual computers on which to execute applications. The virtual machine, or instance, that may be generated to execute applications may be considered an elastic computing instance because a user may launch and tear down the instances as needed. Any DNS queries by an elastic computing instance (e.g., an entity) may be stored in DNS logs accessible to the one or more reputation scoring services 126 along with identifiers of the specific instances used to perform the queries. The one or more reputation scoring services 126 may remove DNS records where no domain name is present, where no response is received for a query, where the query is rejected, and/or when an instance does not have an identifier (e.g., to reduce the large data size to be analyzed). The one or more reputation scoring services 126 may determine from any query a subdomain, second-level domain, and top-level domain of the query.

In one or more embodiments, the one or more reputation scoring services 126 may extract the k-partite graph at step 130 with different types of nodes, such as elastic computing instances (e.g., a unique identifier of an instance that queried a domain), a fully qualified domain name (FQDN, referring to a tuple of the subdomain, second-level domain, and top-level domain that was queried by the instance), a second-level domain and top-level domain pair (e.g., tuple), and IP address in a DNS query response that resolves to the domain. Based on the nodes, the edges of the k-partite graph may include edges between elastic computing instances and a FQDN queried by the instance, edges between a FQDN and an IP address when the FQDN resolved to the IP address, and edges between FQDNs and their pairs of second-level and top-level domains. The k-partite graph may be spatio-temporal in that it may include data for multiple days of cloud-based environment use from multiple regions.

In one or more embodiments, the trust propagation technique may use the spatio-temporal behavior of elastic computing instances and IP addresses based on their connections to previously known domains. For example, when an elastic computing instance has never queried a known malicious domain, and mostly has queried known legitimate domains, it may be more likely than not that other domains queried by the instance may be legitimate. The opposite may be true for instances that mostly query malicious domains. In this manner, one domain may be determined to be malicious (e.g., with a confidence score) based on the other domains queried by the instance that queried the domain. The result may be a semi-supervised message passing method and a max pooling step. The semi-supervised message passing method may include initialization in which the system uses known training labels for initial reputations encoded as +1 for known malicious domains and encoded as −1 for known non-malicious domains (e.g., the known reputation scores of step 132). The semi-supervised message passing method may include belief propagation in which any FQDN may send its reputation to connected nodes in the side partites (e.g., IP, elastic computing instance and second-level domain). The semi-supervised message passing method may include a gather reputation step in which side partite nodes aggregate messages and generate features. The adjusted pooling step may include FQDN partites collecting pooled statistics as stacked features (e.g., at step 132).

In one or more embodiments, the trust propagation technique may scale to large k-partite graphs with billions of nodes and trillions of edges, for example. In particular, at step 132, the one or more reputation scoring services 126 may generate a histogram of neighboring labels for any and all nodes, indicating the number of known malicious ("#bad") domains, known non-malicious ("#good") domains, and the number of unknown ("#unknown") domains. Being connected to a malicious domain may contribute negatively to an entity's reputation score. Because some entities, such as elastic computing instance machines, may serve as proxy servers for cloud-based environment users and may query many good, bad, and unknown domains, the system may generate multiple sets of heuristic features that may indicate an entity's reputation (e.g., step 132).

In one or more embodiments, a first heuristic feature of the features of step 132 may include a weighted average of known good and bad counts (referred to as "linear reputation"). When a node such as an elastic computing instance has no bad neighbors, the node's linear reputation may be set to −1, and may be set to +1 when the node has no good neighbors. A coefficient α may be a coarsely tuned hyper-parameter that reflects the imbalance of connections to both good and bad domains. Using α, the linear reputation $r_{lin}$ may be represented by:

$$r_{lin} = \frac{(\alpha \times \#bad - \#good)}{(\alpha \times \#bad + \#good)}.$$

Because a single bad domain may indicate an attack, associations with bad domains may significantly outweigh associations with good domains. A second heuristic—exponential reputation ($r_{exp}$)—addresses this issue:

$$r_{exp} = \frac{(\#bad - \log(\#good))}{(\#bad + \log(\#good))}.$$

Many domains may not be labeled and may be assumed to be non-malicious, so when a node is connected to many unknown domains, the node may be considered non-malicious. Therefore, a third heuristic feature may be a regularized linear reputation ($r_{linReg}$), and a fourth heuristic feature may be a regularized exponential reputation ($r_{expReg}$), where:

$$r_{linReg} = \frac{(\alpha \times \#bad - \#good - \#\log(\#unknown))}{(\alpha \times \#bad + \#good + \log(\#unknown))} \text{ and } r_{expReg} =$$

-continued $$\frac{(\#bad - \log(\#good) - \log(\#unknown))}{(\#bad + \log(\#good) + \log(\#unknown))}.$$

In one or more embodiments, a FQDN partite of the k-partite graph separately may collect the numbers of #good, #bad, and #unknown domains, as well as the heuristic features $r_{lin}$, $r_{exp}$, $r_{linReg}$, and $r_{expReg}$ of any entities and second-level domain partites. At step 132, the one or more reputation scoring services 126 may determine a minimum value, maximum value, and average value of each of the above variables for any entity or second-level domain. The system also may collect the sum of the heuristic features $r_{lin}$, $r_{exp}$, $r_{linReg}$, and $r_{expReg}$ of any entities and second-level domain partites. At step 134, the one or more reputation scoring services 126 may stack the pooled features from any partite as a single feature vector. Because label information may be used to generate the features, for FQDNs with known labels, a value of one may be subtracted from the #bad or from the #good in the pooled minimum, maximum, and average values.

At step 136, the one or more reputation scoring services 126 may determine the reputation scores based on the feature vector. Using the features of step 132, such as the features for a respective partite of the k-partite graph, the one or more reputation scoring services 126 may determine whether a node should be labeled/scored as malicious or non-malicious (e.g., using a −1 or +1 value as described above) based on whether the node is connected to any known malicious nodes. For example, connections to a threshold number of malicious nodes may result in a malicious score/label for a node. Using semi-supervised graph embedding, the one or more reputation scoring services 126 may embed nodes with malicious labels close to one another, may embed nodes with non-malicious labels close to one another, and may separate the embedding of malicious nodes from non-malicious nodes. When a node connects to another node that is connected to one or more malicious nodes, the node may be labeled/scored malicious (e.g., because malicious domains may be weighted more significantly than non-malicious domains).

The devices 102 and/or the cloud-based environment 110 may include any suitable processor-driven device including, but not limited to, a mobile device or a non-mobile, e.g., a static, device. For example, the device 104 and/or the cloud-based environment 110 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, or the like. It is understood that the above is a list of devices.

FIG. 2 illustrates an example k-partite graph 200 for cloud-based entity reputation scoring, in accordance with one or more example embodiments of the present disclosure.

Referring to FIG. 2, the k-partite graph may be extracted from DNS data, flow logs, security certificate authorities, malware detonation pipelines, and/or other data sources, and may include nodes representing different entities in and external to a cloud-based environment (e.g., the cloud-based environment 110 of FIG. 1). For example, nodes may include elastic computing instances (e.g., elastic computing instances 1-N), FQDNs (e.g., FQDNs 1-M), IP addresses (e.g., IP addresses 1-L), and domain tuples (e.g., domain tuples 1-K, representing K pairs of second-level domains and top-level domains corresponding to the FQDNs. For example, any FQDN may include a tuple of a subdomain, a second-level domain, and a top-level domain queried by any elastic computing instance or other entity of a cloud-based environment.

Still referring to FIG. 2, based on the different nodes, edges 202-216 may be generated between respective nodes. For example, edge 202 may represent the elastic computing instance 1 querying FQDN 1. Edge 204 may represent the elastic computing instance N querying FQDN M. Elastic computing instances may query multiple domains (e.g., adding to the complex nature of determining whether an instance is malicious, as described above). For example, edge 206 may represent the elastic computing instance 1 querying FQDN M, and edge 208 may represent the elastic computing instance N querying FQDN 1. When a FQDN resolves to an IP address, and edge may be generated between the FQDN and the IP address. For example, edge 210 may represent the FQDN 1 resolving to IP address 1, and edge 212 may resolve to FQDN M resolving to IP address L. Another type of edge may be between a FQDN node and the second-level domain/top-level domain pair of the FQDN. For example, edge 214 may be between FQDN 1 and the domain tuple 1 for FQDN 1, and edge 216 may be between FQDN M and the domain tuple K for FQDN M. While some nodes and edges are shown in FIG. 2, the k-partite graph 200 may have many more nodes and edges (e.g., billions of nodes and trillions of edges between nodes), resulting in the need for a highly-scalable machine learning technique for evaluating reputation scores of the many nodes.

In one or more embodiments, the k-partite graph 200 may include multiple types of edges, such as edges between domains and the IP addresses to which the domains have resolved, edges between elastic computing instances and domains that the instances have queried, edges between elastic computing instances and cloud-based environment with which accounts the instances are associated, and the like. The system may use features that span the spatial connectivity of the graph as well as temporal behavior over a specified time period. In this manner, the nodes and edges may be based on data from one or multiple geographic regions of user use of the cloud-based environment, and based on data over potentially multiple days or weeks of time.

In one or more embodiments, the k-partite graph 200 may include nodes based on flow logs, security certificate authorities, malware detonation pipelines, and more. By extending to new data types other than DNS data, the k-partite graph 200 may allow for the determining of reputation scores for other entities in the cloud-based environment. The reputation scoring is described above and in further detail with respect to FIGS. 4A, 4B, and 5.

Figure 3:
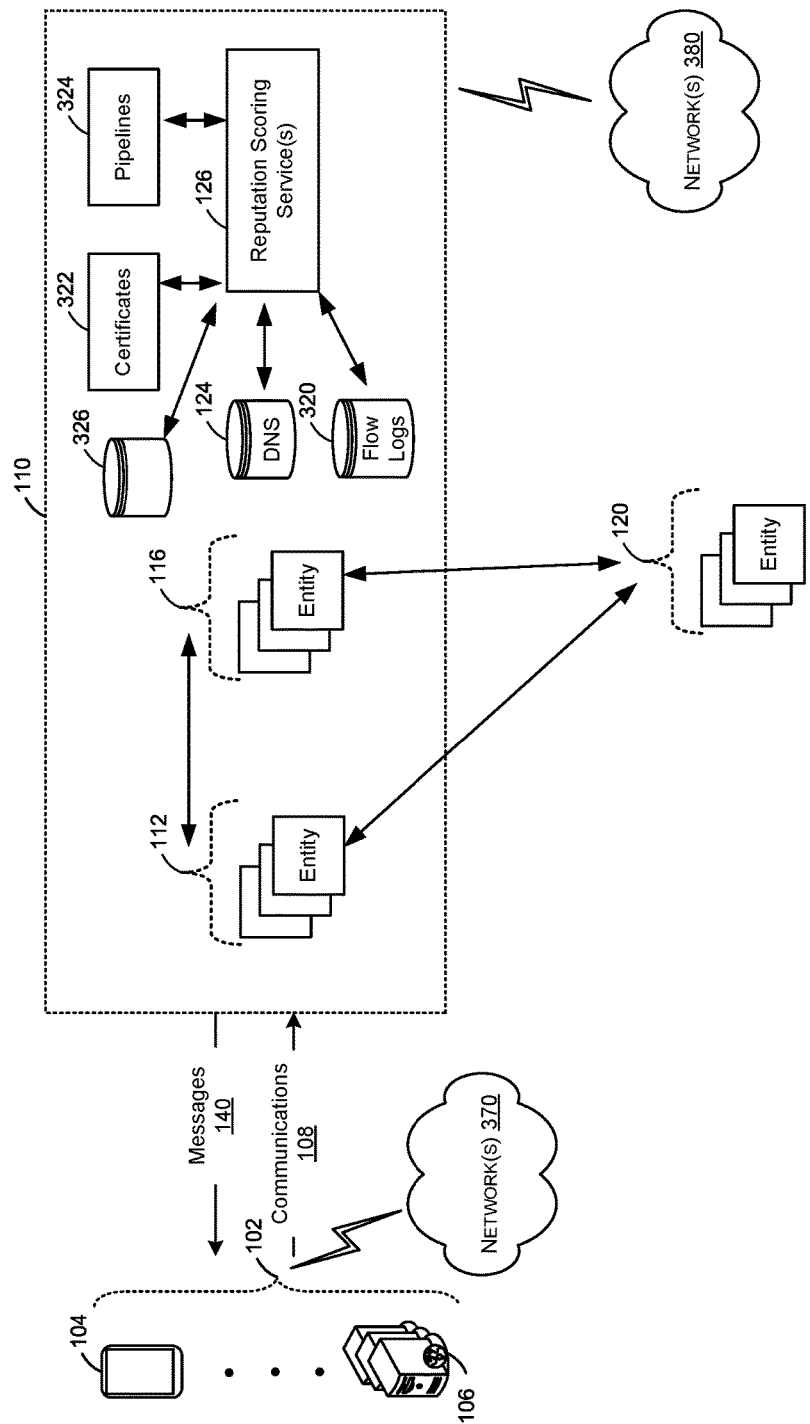
FIG. 3 illustrates an example system for cloud-based entity reputation scoring, in accordance with one or more example embodiments of the present disclosure.

FIG. 3 illustrates an example system 300 for cloud-based entity reputation scoring, in accordance with one or more example embodiments of the present disclosure.

Referring to FIG. 3, the one or more devices 102 of FIG. 1 (e.g., device 104, device 106 may send the communications 108 of FIG. 1 (or other types of calls/communication) to the cloud-based environment 110 of FIG. 1. The communications 108 may cause execution of tasks that may involve one or multiple entities within and/or external to the cloud-based environment 110 (e.g., accessing web pages, reading from/writing to data storage, executing serverless tasks, etc.). For example, the cloud-based environment 110 may include the entities 112 of FIG. 1 (e.g., serverless computing instances, elastic computing instances, addresses binary files, security certificate authorities, etc.) associated with the performance of tasks defined by the communications 108. The tasks performed by the entities 112 may include generating instances that may result in the performance of tasks, such as calling/querying the other entities 116 of the cloud-based environment 110 and/or calling/querying the entities 120 external to the cloud-based environment 110 (e.g., Internet-based entities). Any calls/queries may be stored in data storage (e.g., DNS data storage 124, flow logs 320, etc.). Security certificate authorities 322 may manage security certificates and may be in the cloud-based environment 110, as well as pipelines 324 (e.g., malware detonation pipelines), binary files, and the like.

Still referring to FIG. 3, the cloud-based environment 110 may include the one or more reputation scoring services 126 of FIG. 1, which may access the DNS data storage 124, flow logs 320, security certificate authorities 322, pipelines 324, and other data storage 326 (e.g., standard identification numbers, geographic data, files, etc. Using any combination of the data accessible to the one or more reputation scoring services 126, the one or more reputation scoring services 126 may extract and generate a k-partite graph (e.g., as shown an described with respect to FIG. 2). Based on the k-partite graph, the one or more reputation scoring services 126 may determine reputation scores/labels for any nodes of the k-partite graph (e.g., corresponding to the entities 112, 116, and/or 120), which may be used to control the flow of traffic inside and/or outside of the cloud-based environment 110.

In one or more embodiments, the cloud-based environment 110 may use highly scalable techniques for determining the reputation of internet-based and cloud-based entities, such as domain names, elastic computing instances, IP addresses, certificate authorities, and the like using data that the cloud-based environment 110 already collects (e.g., instead of relying exclusively on external data, such as lists of malicious domains). For example, not only may a domain and its address be evaluated for malicious behavior, but instances that query the domain may be evaluated. The one or more reputation scoring services 126 may use techniques that may scale to large k-partite graphs with billions of nodes and trillions of edges, for example. One technique may include a simplified k-partite graph convolution method that is tailored to minimize the number of false positives when detecting malicious entities. The technique may extract a set of highly informative and robust features from the graph, and may train a machine learning classifier on the features using a small set of known malicious and benign entities. As part of feature extraction process, the technique may propagate entity reputations from known malicious and benign entities to other entities on the graph, hence assigning reputation to any of the entities.

In one or more embodiments, the k-partite graph may include multiple types of edges, such as edges between domains and the IP addresses to which the domains have resolved, edges between elastic computing instances and domains that the instances have queried, edges between elastic computing instances and cloud-based environment with which accounts the instances are associated, and the like. The one or more reputation scoring services 126 may produce a high-quality list of previously unknown malicious domains with almost no false positives using conservative thresholds. The algorithms used by the one or more reputation scoring services 126 may reduce reliance on third parties for detecting emerging threats, and instead may generate knowledge produced by data from within the cloud-based environment. The techniques may be extended to generate reputation scores for IP Addresses, elastic computing instances, and cloud-based environment accounts, for example. The one or more reputation scoring services 126 may use features that span the spatial connectivity of the graph as well as temporal behavior over a specified time period.

In one or more embodiments, the one or more reputation scoring services 126 may expand the k-partite graph to other entities such as flow logs, security certificate authorities, malware detonation pipelines, and more. By extending to new data types other than DNS, the one or more reputation scoring services 126 may determine reputation scores for other entities in the cloud-based environment. For example, the one or more reputation scoring services 126 may be able to identify that all executable binaries from a specific domain should be considered malicious, or all domains with a certain security certificate are related.

In one or more embodiments, the one or more reputation scoring services 126 may use one or more techniques to determine a probability of a cloud-based environment entity being malicious. For example, one technique may include a semi-supervised graph convolution method with minimal parameters and features tailored to minimize the number of false positives when identifying malicious entities (e.g., a trust-based technique). Another technique may learn embeddings for any domain name using a ranking-based energy function. The techniques may allow for identifying malicious entities that were not used in machine learning training, and may detect threats before they are used/invoked. The one or more reputation scoring services 126 may generate a confidence list of domain names and other entities indicating the probability of any entity being malicious, and allowing the cloud-based environment 110 to allow or block access to domains and other entities based on the probabilities.

In one or more embodiments, the one or more reputation scoring services 126 may use the trust-based technique (e.g., a trust-based simplified graph convolution neural network) and/or the energy-based technique (e.g., energy-based knowledge graph embedding) independently and in parallel. Both techniques may convert a neural network's inference and parameter learning operations into functions distributed across an elastic mapping cluster of the cloud-based environment 110. For the trust-based simplified graph convolution neural network, the one or more reputation scoring services 126 may train a regression model on a prediction layer. For the energy-based knowledge graph embedding technique, the one or more reputation scoring services 126 may train embedding vectors in an unsupervised manner. A multilayer perceptron may be trained on top of the embeddings using known labels, for example. The one or more reputation scoring services 126 may perform graph extraction, one or both of the techniques, then a logistic regression prediction for the trust-based simplified graph convolution neural network and/or a feed forward multilayer perceptron for the energy-based knowledge graph embedding technique.

In one or more embodiments, the one or more reputation scoring services 126 may consider DNS log data of elastic computing machines of the cloud-based environment 110 for a period of time (e.g., one week or another time). In particular, the cloud-based environment may allow users to temporarily use virtual computers on which to execute applications. The virtual machine, or instance, that may be generated to execute applications may be considered an elastic computing instance because a user may launch and tear down the instances as needed. Any DNS queries by an elastic computing instance may be stored in DNS logs accessible to the one or more reputation scoring services 126 along with identifiers of the specific instances used to perform the queries. The one or more reputation scoring services 126 may remove DNS records where no domain name is present, where no response is received for a query, where the query is rejected, and/or when an instance does not have an identifier (e.g., to reduce the large data size to be analyzed). The one or more reputation scoring services 126 may determine from any query a subdomain, second-level domain, and top-level domain of the query.

In one or more embodiments, the one or more reputation scoring services 126 may extract a k-partite graph from the DNS data and/or other accessible data, with different types of nodes, such as elastic computing instances (e.g., a unique identifier of an instance that queried a domain), a FQDN, a second-level domain and top-level domain pair (e.g., tuple), and IP address in a DNS query response that resolves to the domain. Based on the nodes, the edges of the k-partite graph may include edges between elastic computing instances and a FQDN queried by the instance, edges between a FQDN and an IP address when the FQDN resolved to the IP address, and edges between FQDNs and their pairs of second-level and top-level domains. The k-partite graph may be spatio-temporal in that it may include data for multiple days of cloud-based environment use from multiple regions.

In one or more embodiments, the trust propagation technique may use the spatio-temporal behavior of elastic computing instances and IP addresses based on their connections to previously known domains. For example, when an elastic computing instance has never queried a known malicious domain, and mostly has queried known legitimate domains, it may be more likely than not that other domains queried by the instance may be legitimate. The opposite may be true for instances that mostly query malicious domains. In this manner, one domain may be determined to be malicious (e.g., with a confidence score) based on the other domains queried by the instance that queried the domain. The result may be a semi-supervised message passing method and a max pooling step. The semi-supervised message passing method may include initialization in which the one or more reputation scoring services 126 uses known training labels for initial reputations encoded as +1 for known malicious domains and encoded as −1 for known non-malicious domains. The semi-supervised message passing method may include belief propagation in which any FQDN may send its reputation to connected nodes in the side partites (e.g., IP, elastic computing instance and second-level domain). The semi-supervised message passing method may include a gather reputation step in which side partite nodes aggregate messages and generate features. The adjusted pooling step may include FQDN partites collecting pooled statistics as stacked features.

In one or more embodiments, the trust propagation technique may scale to such large k-partite graphs. In particular, in the gather reputation step described above, the one or more reputation scoring services 126 may generate a histogram of neighboring labels for any and all nodes, indicating the number of known malicious ("#bad") domains, known non-malicious ("#good") domains, and the number of unknown ("#unknown") domains. Being connected to a malicious domain may contribute negatively to an entity's reputation score. Because some entities, such as elastic computing instance machines, may serve as proxy servers for cloud-based environment users and may query many good, bad, and unknown domains, the system may generate multiple sets of heuristic features that may indicate an entity's reputation.

In one or more embodiments, a first heuristic feature may include a weighted average of known good and bad counts (referred to as "linear reputation"). When a node such as an elastic computing instance has no bad neighbors, the node's linear reputation may be set to −1, and may be set to +1 when the node has no good neighbors. A coefficient α may be a coarsely tuned hyper-parameter that reflects the imbalance of connections to both good and bad domains. Using α, the linear reputation $r_{lin}$ may be represented by:

$$r_{lin} = \frac{(\alpha \times \#bad - \#good)}{(\alpha \times \#bad + \#good)}.$$

Because a single bad domain may indicate an attack, associations with bad domains may significantly outweigh associations with good domains. A second heuristic—exponential reputation ($r_{exp}$)—addresses this issue:

$$r_{exp} = \frac{(\#bad - \log(\#good))}{(\#bad + \log(\#good))}.$$

Many domains may not be labeled and may be assumed to be non-malicious, so when a node is connected to many unknown domains, the node may be considered non-malicious. Therefore, a third heuristic feature may be a regularized linear reputation ($r_{linReg}$), and a fourth heuristic feature may be a regularlized exponential reputation ($r_{expReg}$), where:

$$r_{linReg} = \frac{(\alpha \times \#bad - \#good - \#\log(\#unknown))}{(\alpha \times \#bad + \#good + \log(\#unknown))} \text{ and}$$

$$r_{expReg} = \frac{(\#bad - \log(\#good) - \log(\#unknown))}{(\#bad + \log(\#good) + (\log(\#unknown))}.$$

In one or more embodiments, a FQDN partite of the k-partite graph separately may collect the numbers of #good, #bad, and #unknown domains, as well as the heuristic features $r_{lin}$, $r_{exp}$, $r_{linReg}$, and $r_{expReg}$ of any entities and second-level domain partites. In the pooling step described above, the one or more reputation scoring services 126 may determine a minimum value, maximum value, and average value of each of the above variables for any entity or second-level domain. The system also may collect the sum of the heuristic features $r_{lin}$, $r_{exp}$, $r_{linReg}$, and $r_{expReg}$ of any entities and second-level domain partites. The one or more reputation scoring services 126 may stack the pooled features from any partite as a single feature vector. Because label information may be used to generate the features, for FQDNs with known labels, a value of one may be subtracted from the #bad or from the #good in the pooled minimum, maximum, and average values.

In one or more embodiments, the one or more reputation scoring services 126 may use graph embedding. The extracted graph described above may be heterogeneous, and the edges between nodes may represent different meanings and types of relationships between the nodes. Therefore, nodes with different labels may be embedded far away from one another (e.g., more than a threshold distance). Nodes that are neighbors in the graph therefore may be similar to one another, and nodes that are not neighbors (e.g., are separated by a threshold distance) may not have a similar embedding. To achieve such embedding, a joint loss function maybe used. However, two issues may occur. One issue may be that the size of the graph is too large to train in a timely manner. Another issue may be that malicious entities may query so many good domains to disguise themselves as non-malicious. To address the size issue, the one or more reputation scoring services 326 may learn the embeddings without supervision, using an energy-based model, for example. The one or more reputation scoring services 126 may learn a classification model on top of learned embeddings. To address the disguise issue, the one or more reputation scoring services 126 may control the effect of any node on its neighboring nodes by weighting a contribution.

In one or more embodiments, the energy-based embedding technique may learn embeddings in a manner that maximizes an energy function over the cloud-based environment. For example, let G=(V,E) be the graph, where V is the set of vertices and E is the set of edges. The energy may be decomposable for any node in the graph: Energy(G) $=\Sigma_{v_i \in V} \text{score}(v_i)$. A scoring function such as the following may be used: Score(v)=$\mathbb{E}$ [sim($v_i,v_j$)|$v_j \in N(v_j)$]−$\mathbb{E}$ [max(0,sim($v_i,v_j$)+λ)|$v_j \in N(v_j)$]. The similarity function may be the cosine similarity between two vectors that is discounted by the geographic mean of fan-out and fan-in of sender and receiver nodes of the graph:

$$\text{sim}(v_i, v_j) = \alpha_{ij} v_i^T v_j, \text{ and } \alpha_{ij} = \frac{1}{\sqrt{deg(v_i)deg(v_i)}}.$$

The discounting factor $\alpha_{ij}$ may be a heuristic coefficient based on the degrees of $v_i$ and $v_j$ in the graph. As a result of downscaling, when a node is connected to many other nodes, the contribution of any edge between node and the other nodes in the total energy of the cloud-based environment may be less than the edges of a node with a lower degree. The scoring function above may result in a simplified rank-based energy function. When sim($v_i,v_j$) is high on average (e.g., above a threshold) for $v_j$'s in the neighborhood of a node, the node may be similar to its neighboring nodes. On the negative side of the scoring function, max(0,sim($v_i,v_j$)+λ) may dictate that a node should not be similar to its non-neighboring nodes. For example, when λ=0, embeddings of disconnected vertices may not be penalized as long as they are perpendicular or are not aligned with one another (e.g., sim($v_i,v_j$)=0). However, λ=1 may penalize embeddings of disconnected vertices unless two embedding vectors point in opposite directions. For efficient negative sampling, the one or more reputation scoring services 126 randomly may draw nodes from any and all partites of the graph. Instead of drawing negative samples for existing edges, the negative sampling may generate a random integer for any sample.

The one or more devices 102 may be configured to communicate via a communications network 370, and/or the cloud-based environment 110 may be configured to communicate via a communications network 380, wirelessly or wired (e.g., the same or different wireless communications networks). The communications network 370 and/or the communications network 380 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 370 and/or the communications network 380 may have any suitable communication range associated therewith and may include, for example, global networks (e.g., the Internet), metropolitan area networks (MANs), wide area networks (WANs), local area networks (LANs), or personal area networks (PANs). In addition, communications network 370 and/or the communications network 380 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 4A:
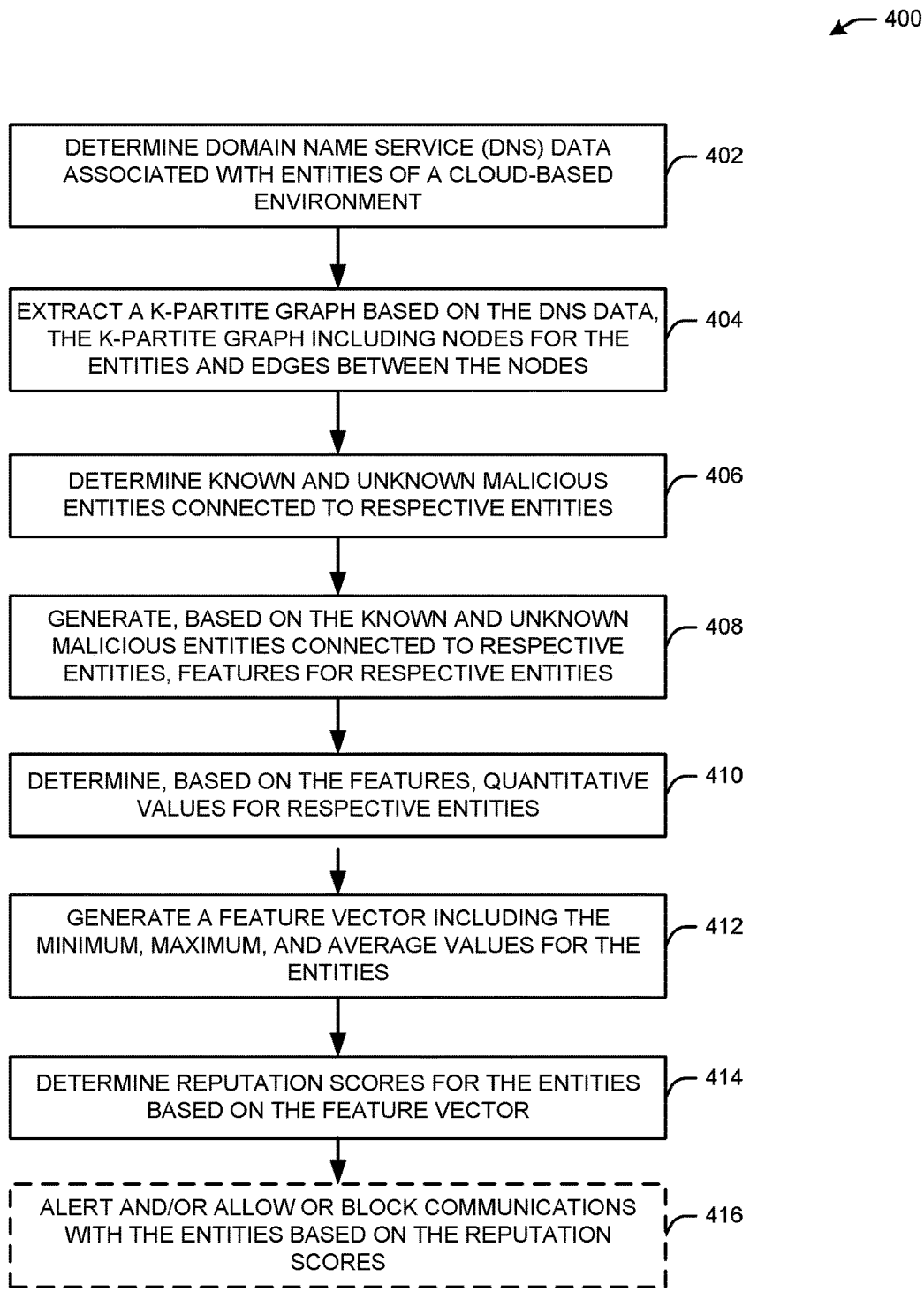
FIG. 4A illustrates a flow diagram for a process for cloud-based entity reputation scoring, in accordance with one or more example embodiments of the present disclosure.

FIG. 4A illustrates a flow diagram for a process 400 for cloud-based entity reputation scoring, in accordance with one or more example embodiments of the present disclosure.

At block 402, a system (or device, e.g., the cloud-based environment 110 of FIG. 1 and FIG. 3) may determine data, such as DNS data (e.g., queries and responses), flow log data, security certificate authorities, pipeline data, and the like, representing interactions involving entities in and/or external to a cloud-based environment. For example, a cloud-based computing instance (e.g., a serverless computing instance, an elastic computing instance, etc.) may query or otherwise interact with domains (e.g., FQDNs), other entities in the cloud-based environment, and/or other entities external to the cloud-based environment. The data may indicate the instances, domains, and/or other entities used, some of which may have known scores/labels indicating whether the entities are malicious or not, and some entities not having known scores/labels indicating whether an entity is malicious.

At block 404, the system may extract, based on the data from block 402, a k-partite graph including multiple (e.g., billions) of nodes and many (e.g., trillions) of edges between the nodes. The nodes may represent the entities inside of and/or external to the cloud-based environment, such as computing instances, domains, IP addresses to which domains resolve, tuples of second-level domains and top-level domains for respective FQDNs, and the like. Edges may indicate queries or other interactions between nodes. In this manner, some nodes many have many edges connecting to other nodes, such as many domains queried by an instance.

At block 406, the system may determine labels/scores indicating known and unknown malicious entities. The system may use known training labels for initial reputations encoded as +1 for known malicious domains and encoded as −1 for known non-malicious domains, for example.

At block 408, the system may generate, based on the known and unknown labels/scores, features for respective entities/nodes. In particular, the system may generate a histogram of neighboring labels for any and all nodes, indicating the number of known malicious ("#bad") domains, known non-malicious ("#good") domains, and the number of unknown ("#unknown") domains. Being connected to a malicious domain may contribute negatively to an entity's reputation score. Because some entities, such as elastic computing instance machines, may serve as proxy servers for cloud-based environment users and may query many good, bad, and unknown domains, the system may generate multiple sets of heuristic features that may indicate an entity's reputation. A first heuristic feature may include a weighted average of known good and bad counts (referred to as "linear reputation"). When a node such as an elastic computing instance has no bad neighbors, the node's linear reputation may be set to −1, and may be set to +1 when the node has no good neighbors. A coefficient α may be a coarsely tuned hyper-parameter that reflects the imbalance of connections to both good and bad domains. Using α, the linear reputation $r_{lin}$ may be represented by:

$$r_{lin} = \frac{(\alpha \times \#bad - \#good)}{(\alpha \times \#bad + \#good)}.$$

Because a single bad domain may indicate an attack, associations with bad domains may significantly outweigh associations with good domains. A second heuristic—exponential reputation ($r_{exp}$)—addresses this issue:

$$r_{exp} = \frac{(\#bad - \log(\#good))}{(\#bad + \log(\#good))}.$$

Many domains may not be labeled and may be assumed to be non-malicious, so when a node is connected to many unknown domains, the node may be considered non-malicious. Therefore, a third heuristic feature may be a regularized linear reputation ($r_{linReg}$), and a fourth heuristic feature may be a regularlized exponential reputation ($r_{expReg}$), where:

$$r_{linReg} = \frac{(\alpha \times \#bad - \#good - \#\log(\#unknown))}{(\alpha \times \#bad + \#good + \log(\#unknown))} \text{ and}$$

$$r_{expReg} = \frac{(\#bad - \log(\#good) - \log(\#unknown))}{(\#bad + \log(\#good) + (\log(\#unknown))}.$$

At block 410, the system may determine quantitative values for any entities based on the features for a respective entity. Rather than having to learn all features of an entity, the system may predefine values to determine for respective entities, such as minimum, maximum, and average values, geometric averages, and values that may be based on neighborhood of nodes or global (e.g., not exclusive to a particular neighborhood/partite). A FQDN partite of the k-partite graph separately may collect the numbers of #good, #bad, and #unknown domains, as well as the heuristic features $r_{lin}$, $r_{exp}$, $r_{linReg}$, and $r_{expReg}$ of any entities and second-level domain partites. The system may determine a minimum value, maximum value, and average value of each of the above variables for any entity or second-level domain. The system also may collect the sum of the heuristic features $r_{lin}$, $r_{exp}$, $r_{linReg}$, and $r_{expReg}$ of any entities and second-level domain partites.

At block 412, the system may generate a feature vector including the minimum, maximum, and average values of respective entities. The system may stack the pooled features from any partite as a single feature vector. Because label information may be used to generate the features, for FQDNs with known labels, a value of one may be subtracted from the #bad or from the #good in the pooled minimum, maximum, and average values.

At block 414, the system may determine reputation scores for the entities based on the feature vector. The system may determine whether a node should be labeled/scored as malicious or non-malicious (e.g., using a −1 or +1 value as described above) based on whether the node is connected to any known malicious nodes. For example, connections to a threshold number of malicious nodes may result in a malicious score/label for a node. The system may use a logistical regression for the vector to determine the reputation scores. The reputation score may represent a probability of the node/entity being malicious, and the system may compare the score (e.g., probability) to a threshold score. When the score satisfies the threshold (e.g., exceeds or fails to exceed), the system may label the entity/node as malicious. Otherwise, the system may label the entity/node as non-malicious.

At block 416, the system optionally may allow/approve or block communications with/using entities based on the reputation scores. For example, when users and/or entities query, call, or otherwise communicate with other entities, the system may determine the reputation score of the entity, and allow the communication when the reputation score satisfies (e.g., exceeds or is below) a score threshold. When the reputation score does not satisfy a threshold, indicative of the entity being malicious, the system may block communications using a malicious entity. The system additionally or alternatively may alert/warn users of possibly malicious entities. The system, additionally or alternatively, may reduce false positive identification of malicious entities by filtering low-scoring entities (e.g., domains) from a list of malicious domains (e.g., third-party lists of malicious domains). The system may send the reputation scores to another service that may monitor communications based on the scores.

Figure 4B:
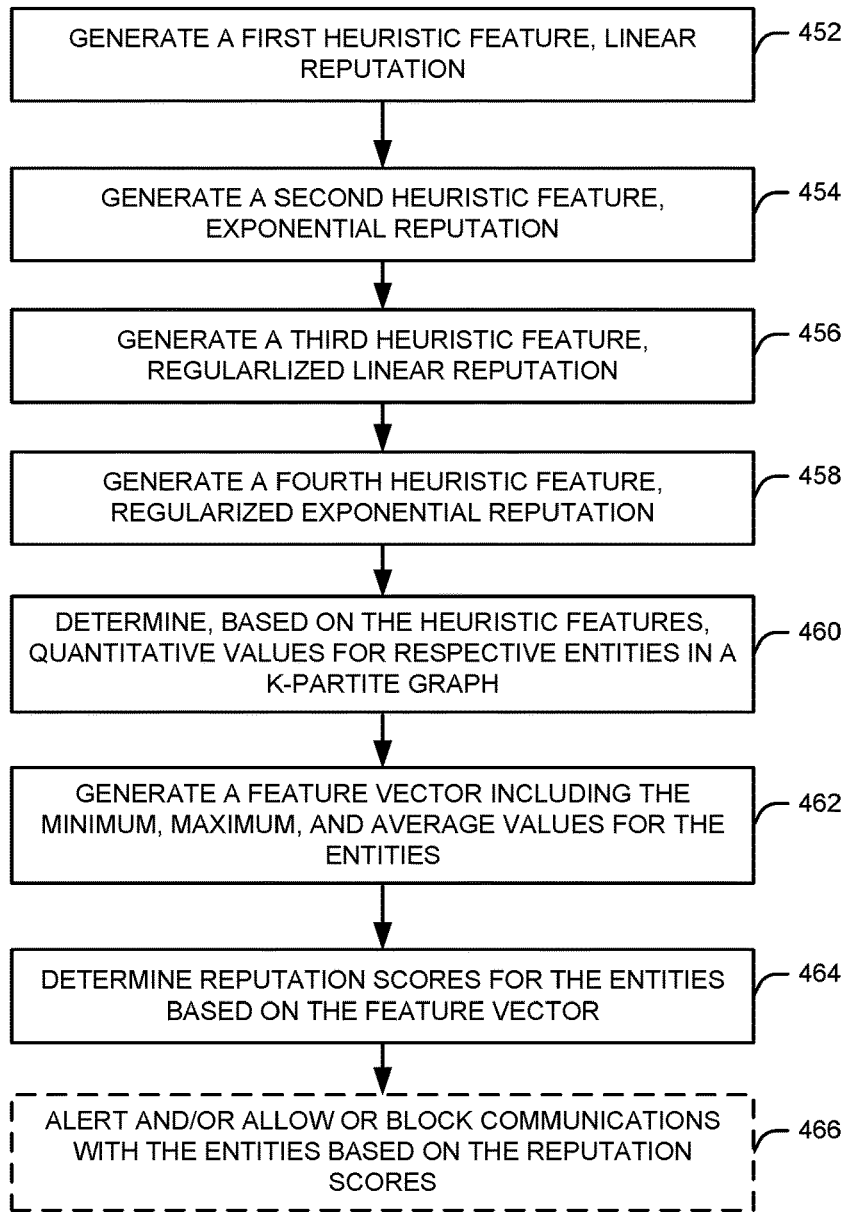
FIG. 4B illustrates a flow diagram for a process for cloud-based entity reputation scoring, in accordance with one or more example embodiments of the present disclosure.

FIG. 4B illustrates a flow diagram for a process 450 for cloud-based entity reputation scoring, in accordance with one or more example embodiments of the present disclosure. The process 450 may correspond to block 408 of FIG. 4A.

At block 452, a system (or device, e.g., the cloud-based environment 110 of FIG. 1 and FIG. 3) may generate a first heuristic feature based on a number of nodes connected to a node and having known malicious scores/labels, a number of nodes connected to a node and having known non-malicious scores/labels, and a number of nodes connected to a node and having unknown labels/scores (e.g., not having a score/label). In particular, the system may generate a histogram of neighboring labels for any and all nodes, indicating the number of known malicious ("#bad") domains, known non-malicious ("#good") domains, and the number of unknown ("#unknown") domains. Being connected to a malicious domain may contribute negatively to an entity's reputation score. Because some entities, such as elastic computing instance machines, may serve as proxy servers for cloud-based environment users and may query many good, bad, and unknown domains, the system may generate multiple sets of heuristic features that may indicate an entity's reputation. A first heuristic feature may include a weighted average of known good and bad counts (referred to as "linear reputation"). When a node such as an elastic computing instance has no bad neighbors, the node's linear reputation may be set to −1, and may be set to +1 when the node has no good neighbors. A coefficient α may be a coarsely tuned hyper-parameter that reflects the imbalance of connections to both good and bad domains. Using α, the linear reputation (the first heuristic feature) $r_{lin}$ may be represented by:

$$r_{lin} = \frac{(\alpha \times \#bad - \#good)}{(\alpha \times \#bad + \#good)}.$$

Because a single bad domain may indicate an attack, associations with bad domains may significantly outweigh associations with good domains.

At block 454, the system may generate a second heuristic feature based on a number of nodes connected to a node and having known malicious scores/labels, a number of nodes connected to a node and having known non-malicious scores/labels, and a number of nodes connected to a node and having unknown labels/scores (e.g., not having a score/label). Because a single bad domain may indicate an attack, associations with bad domains may significantly outweigh associations with good domains. The second heuristic feature—exponential reputation ($r_{exp}$)—addresses this issue:

$$r_{exp} = \frac{(\#bad - \log(\#good))}{(\#bad + \log(\#good))}.$$

At block 456, the system may generate a third heuristic feature based on a number of nodes connected to a node and having known malicious scores/labels, a number of nodes connected to a node and having known non-malicious scores/labels, and a number of nodes connected to a node and having unknown labels/scores (e.g., not having a score/label). Many domains may not be labeled and may be assumed to be non-malicious, so when a node is connected to many unknown domains, the node may be considered non-malicious. Therefore, the third heuristic feature may be a regularlized linear reputation ($r_{linReg}$), where:

$$r_{linReg} = \frac{(\alpha \times \#bad - \#good - \#\log(\#unknown))}{(\alpha \times \#bad + \#good + \log(\#unknown))}$$

At block 458, the system may generate a fourth heuristic feature based on a number of nodes connected to a node and having known malicious scores/labels, a number of nodes connected to a node and having known non-malicious scores/labels, and a number of nodes connected to a node and having unknown labels/scores (e.g., not having a score/label). Many domains may not be labeled and may be assumed to be non-malicious, so when a node is connected to many unknown domains, the node may be considered non-malicious. The fourth heuristic feature may be a regularlized exponential reputation ($r_{expReg}$), and $$r_{expReg} = \frac{(\#bad - \log(\#good) - \log(\#unknown))}{(\#bad + \log(\#good) + (\log(\#unknown))}.$$

At block 460, the system may determine quantitative values for any entities based on the features for a respective entity. Rather than having to learn all features of an entity, the system may predefine values to determine for respective entities, such as minimum, maximum, and average values, geometric averages, and values that may be based on neighborhood of nodes or global (e.g., not exclusive to a particular neighborhood/partite). A FQDN partite of the k-partite graph separately may collect the numbers of #good, #bad, and #unknown domains, as well as the heuristic features $r_{lin}$, $r_{exp}$, $r_{linReg}$, and $r_{expReg}$ of any entities and second-level domain partites. The system may determine a minimum value, maximum value, and average value of each of the above variables for any entity or second-level domain. The system also may collect the sum of the heuristic features $r_{lin}$, $r_{exp}$, $r_{linReg}$, and $r_{expReg}$ of any entities and second-level domain partites.

At block 462, the system may generate a feature vector including the minimum, maximum, and average values of respective entities. The system may stack the pooled features from any partite as a single feature vector. Because label information may be used to generate the features, for FQDNs with known labels, a value of one may be subtracted from the #bad or from the #good in the pooled minimum, maximum, and average values.

At block 464, the system may determine reputation scores for the entities based on the feature vector. The system may determine whether a node should be labeled/scored as malicious or non-malicious (e.g., using a −1 or +1 value as described above) based on whether the node is connected to any known malicious nodes. For example, connections to a threshold number of malicious nodes may result in a malicious score/label for a node. The system may use a logistical regression for the vector to determine the reputation scores. The reputation score may represent a probability of the node/entity being malicious, and the system may compare the score (e.g., probability) to a threshold score. When the score satisfies the threshold (e.g., exceeds or fails to exceed), the system may label the entity/node as malicious. Otherwise, the system may label the entity/node as non-malicious.

At block 466, the system optionally may allow/approve or block communications with/using entities based on the reputation scores. For example, when users and/or entities query, call, or otherwise communicate with other entities, the system may determine the reputation score of the entity, and allow the communication when the reputation score satisfies (e.g., exceeds or is below) a score threshold. When the reputation score does not satisfy a threshold, indicative of the entity being malicious, the system may block communications using a malicious entity. The system additionally or alternatively may alert/warn users of possibly malicious entities. The system, additionally or alternatively, may reduce false positive identification of malicious entities by filtering low-scoring entities (e.g., domains) from a list of malicious domains (e.g., third-party lists of malicious domains). The system may send the reputation scores to another service that may monitor communications based on the scores.

Figure 5:
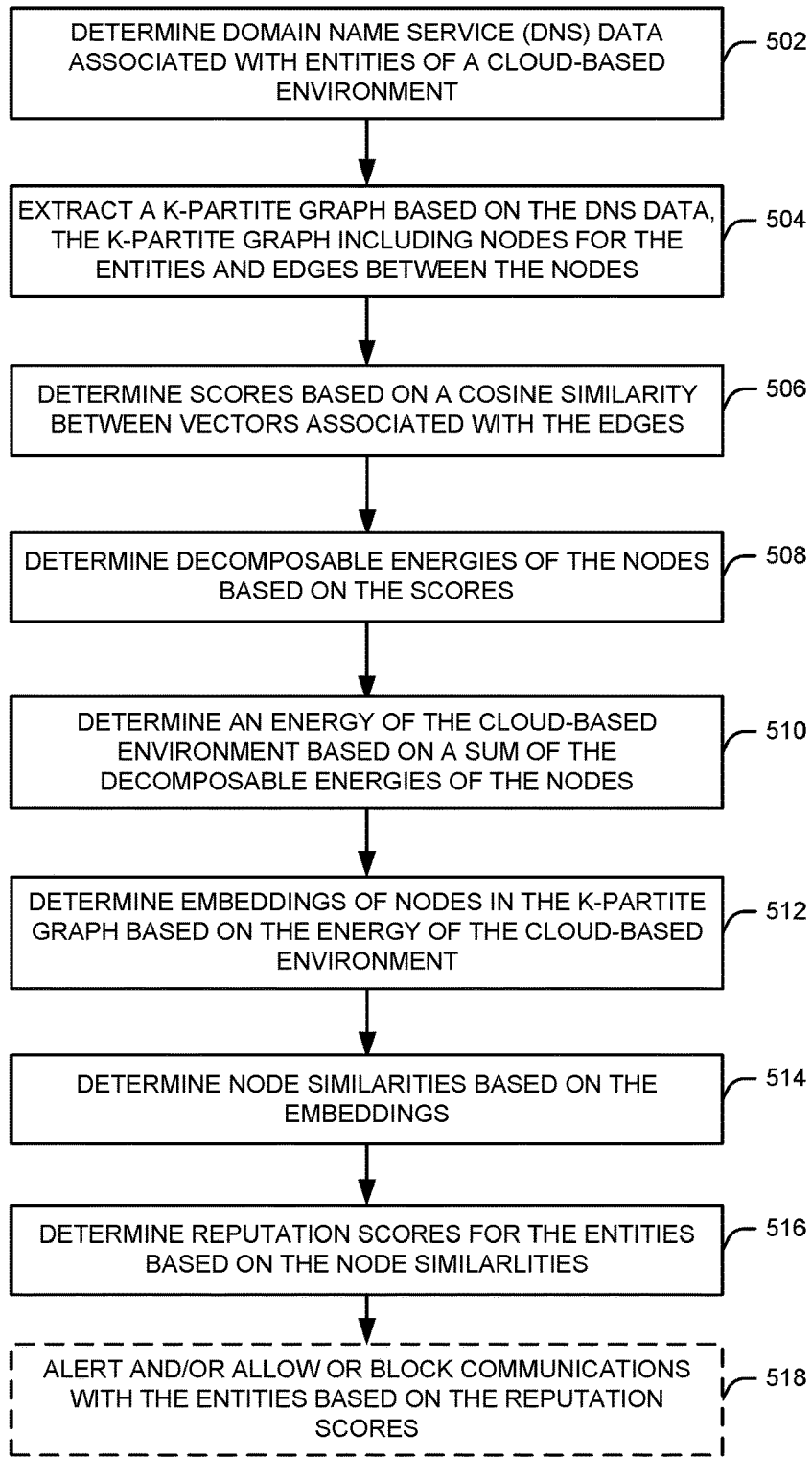
FIG. 5 illustrates a flow diagram for a process for cloud-based entity reputation scoring, in accordance with one or more example embodiments of the present disclosure.

FIG. 5 illustrates a flow diagram for a process 500 for cloud-based entity reputation scoring, in accordance with one or more example embodiments of the present disclosure.

At block 502, a system (or device, e.g., the cloud-based environment 110 of FIG. 1 and FIG. 3) may determine data, such as DNS data (e.g., queries and responses), flow log data, security certificate authorities, pipeline data, and the like, representing interactions involving entities in and/or external to a cloud-based environment. For example, a cloud-based computing instance (e.g., a serverless computing instance, an elastic computing instance, etc.) may query or otherwise interact with domains (e.g., FQDNs), other entities in the cloud-based environment, and/or other entities external to the cloud-based environment. The data may indicate the instances, domains, and/or other entities used, some of which may have known scores/labels indicating whether the entities are malicious or not, and some entities not having known scores/labels indicating whether an entity is malicious.

At block 504, the system may extract, based on the data from block 502, a k-partite graph including multiple (e.g., billions) of nodes and many (e.g., trillions) of edges between the nodes. The nodes may represent the entities inside of and/or external to the cloud-based environment, such as computing instances, domains, IP addresses to which domains resolve, tuples of second-level domains and top-level domains for respective FQDNs, and the like. Edges may indicate queries or other interactions between nodes. In this manner, some nodes many have many edges connecting to other nodes, such as many domains queried by an instance.

At block 506, the system may determine scores based on cosine similarity between vectors associated with the edges of the k-partite graph. For example, let G=(V,E) be the graph, where V is the set of vertices and E is the set of edges. The scoring function may be: Score(v)=$\mathbb{E}$ [sim($v_i,v_j$)|$v_j \in$N($v_j$)]−$\mathbb{E}$ [max(0,sim($v_i,v_j$)+λ)|$v_j \in$N($v_j$)]. The similarity function may be the cosine similarity between two vectors that is discounted by the geographic mean of fan-out and fan-in of sender and receiver nodes of the graph:

$$\text{sim}(v_i, v_j) = \alpha_{ij} v_i^T v_j, \text{ and } \alpha_{ij} = \frac{1}{\sqrt{deg(v_i)deg(v_i)}}.$$

The discounting factor $\alpha_{ij}$ may be a heuristic coefficient based on the degrees of $v_i$ and $v_j$ in the graph. As a result of downscaling, when a node is connected to many other nodes, the contribution of any edge between node and the other nodes in the total energy of the cloud-based environment may be less than the edges of a node with a lower degree. The scoring function above may result in a simplified rank-based energy function.

At block 508, the system may determine decomposable energies of the nodes of the k-partite graph. The energy may be decomposable for any node in the graph: Energy(G)=$\Sigma_{v_i \in V}$score($v_i$), with the score defined at block 506. At block 510, the system may determine the energy of the cloud-based environment by adding the scores of the nodes using the summation above.

At block 512, the system may determine embeddings of nodes of the graph based on the energy of the cloud-based environment. When sim($v_i,v_j$) is high on average (e.g., above a threshold) for $v_j$'s in the neighborhood of a node, the node may be similar to its neighboring nodes. On the negative side of the scoring function, max(0,sim($v_i,v_j$)+λ) may dictate that a node should not be similar to its non-neighboring nodes. For example, when λ=0, embeddings of disconnected vertices may not be penalized as long as they are perpendicular or are not aligned with one another (e.g., sim($v_i,v_j$)=0). However, λ=1 may penalize embeddings of disconnected vertices unless two embedding vectors point in opposite directions. For efficient negative sampling, the system randomly may draw nodes from any and all partites of the graph. Instead of drawing negative samples for existing edges, the negative sampling may generate a random integer for any sample. In this manner, at block 514, the system may determine node similarities based on the embeddings.

At block 516, the system may determine reputation scores for the entities based on the feature vector. The system may determine whether a node should be labeled/scored as malicious or non-malicious (e.g., using a −1 or +1 value as described above) based on whether the node is connected to any known malicious nodes. For example, connections to a threshold number of malicious nodes may result in a malicious score/label for a node. Using semi-supervised graph embedding, the system may embed nodes with malicious labels close to one another, may embed nodes with non-malicious labels close to one another, and may separate the embedding of malicious nodes from non-malicious nodes. When a node connects to another node that is connected to one or more malicious nodes, the node may be labeled/scored malicious (e.g., because malicious domains may be weighted more significantly than non-malicious domains).

At block 518, the system optionally may allow/approve or block communications with/using entities based on the reputation scores. For example, when users and/or entities query, call, or otherwise communicate with other entities, the system may determine the reputation score of the entity, and allow the communication when the reputation score satisfies (e.g., exceeds or is below) a score threshold. When the reputation score does not satisfy a threshold, indicative of the entity being malicious, the system may block communications using a malicious entity. The system additionally or alternatively may alert/warn users of possibly malicious entities. The system, additionally or alternatively, may reduce false positive identification of malicious entities by filtering low-scoring entities (e.g., domains) from a list of malicious domains (e.g., third-party lists of malicious domains). The system may send the reputation scores to another service that may monitor communications based on the scores.

These examples are not meant to be limiting.

Figure 6:
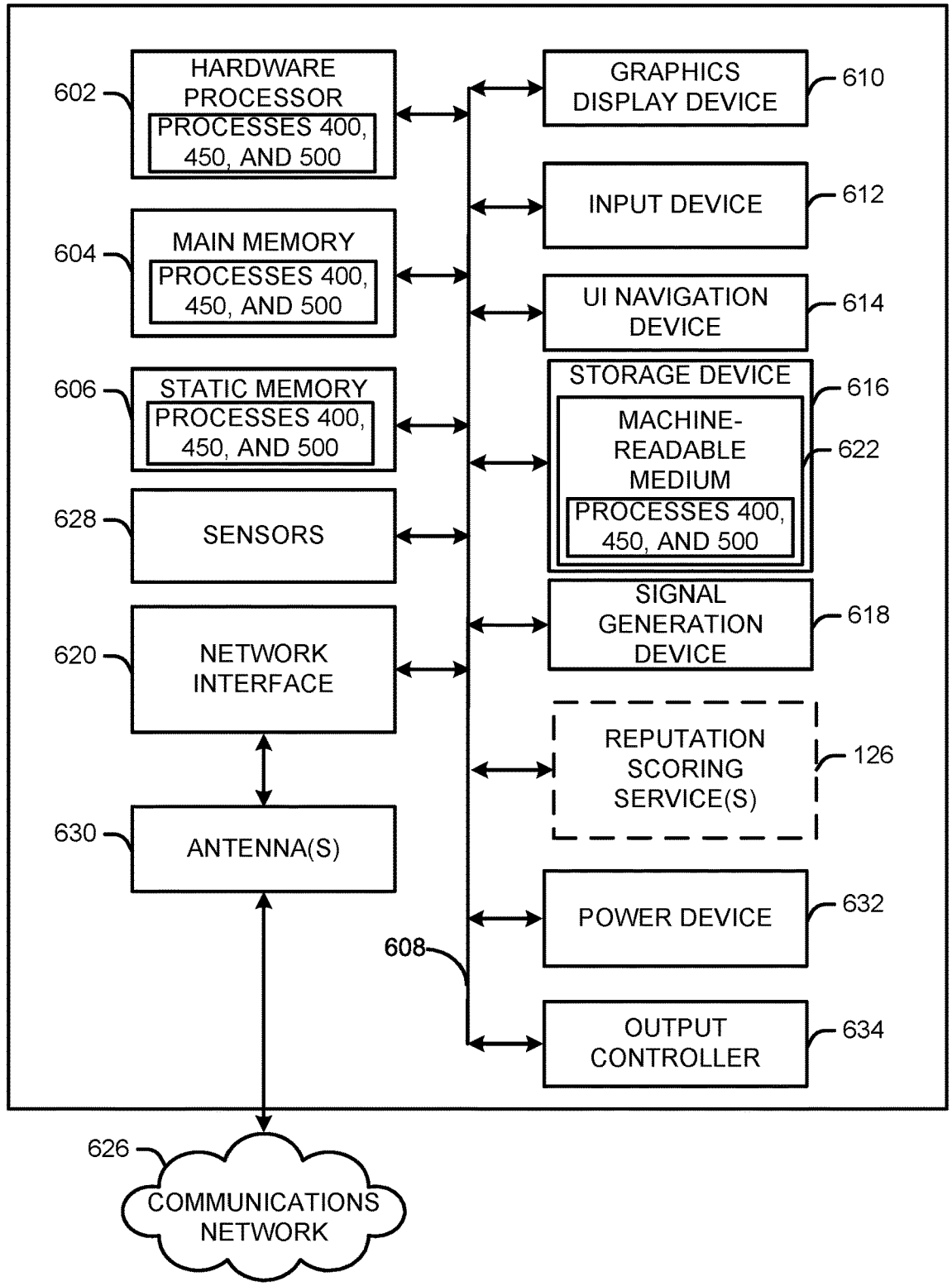
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 or system (e.g., the devices 102 of FIG. 1 and FIG. 3, the cloud-based environment 110 of FIG. 1 and FIG. 3) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a personal digital assistant (PDA), a mobile telephone, a wearable computer device, a web appliance, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, the one or more reputation scoring services 126 of FIG. 1 and FIG. 3 (e.g., one or more modules capable of performing the process 400 of FIG. 4A, the process 450 of FIG. 4B, and/or the process 500 of FIG. 5), a network interface device/transceiver 620 coupled to antenna(s) 630, and one or more sensors 628, such as a global positioning system (GPS) sensor, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions (e.g., software) embodying or utilized by any one or more of the techniques or functions described herein. The instructions may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for determining reputation scores of cloud-based environment entities, the method comprising:

determining, by at least one processor of a cloud-based environment, domain name service (DNS) data associated with elastic computing instances of the cloud-based environment, the DNS data associated with multiple days and multiple geographic regions;

extracting, by the at least one processor, based on the DNS data, a k-partite graph comprising at least one billion nodes and at least one trillion edges between the nodes, wherein a first node of the nodes comprises a first elastic computing instance of the elastic computing instances, and wherein a second node of the nodes comprises a first fully qualified domain name (FQDN), and wherein a third node of the nodes comprises a second FQDN;

encoding, by a machine learning model of the cloud-based environment, a first reputation score associated with the first FQDN, the first reputation score indicative of the first FQDN being a malicious domain or a non-malicious domain;

encoding, by the machine learning model, a second reputation score associated with the second FQDN, the second reputation score indicative of the second FQDN being a malicious domain or a non-malicious domain;

determining, by the machine learning model, based on the first reputation score and the second reputation score, a number of malicious nodes connected to the first elastic computing instance, a number of non-malicious nodes connected to the first elastic computing instance, and a number of nodes connected to the first elastic computing instance, the number of nodes having unknown reputation scores;

generating, by the machine learning model, based on the number of malicious nodes connected to the first elastic computing instance, the number of non-malicious nodes connected to the first elastic computing instance, and the number of nodes connected to the first elastic computing instance and having unknown reputation scores, heuristic features associated with the first elastic computing instance;

determining, by the machine learning model, based on the heuristic features, the number of malicious nodes connected to the first elastic computing instance, the number of non-malicious nodes connected to the first elastic computing instance, and the number of nodes connected to the first elastic computing instance and having unknown reputation scores, a minimum value, a maximum value, and an average value, wherein the minimum value, the maximum value, and the average value are based on ratios of malicious nodes to non-malicious nodes;

generating, by the machine learning model, a feature vector comprising the minimum value, the maximum value, and the average value;

determining, by the machine learning model, based on the feature vector, a third reputation score associated with the first FQDN;

determining, by the machine learning model, based on the feature vector, a fourth reputation score associated with the second FQDN; and communicating, by the at least one processor, based on at least one of the third reputation score or the fourth reputation score.

2. The method of claim 1, wherein a fourth node of the nodes comprises a second elastic computing instance of the elastic computing instances, and wherein a fifth node of the nodes comprises a third FQDN, the method further comprising:

determining, based on the third FQDN, a number of malicious nodes connected to the second elastic computing instance, a number of non-malicious nodes connected to the second elastic computing instance, and a number of nodes connected to the second elastic computing instance, the number of nodes having unknown reputation scores;

generating, based on the number of malicious nodes connected to the second elastic computing instance, the number of non-malicious nodes connected to the second elastic computing instance, and the number of nodes connected to the second elastic computing instance and having unknown reputation scores, second heuristic features associated with the second elastic computing instance;

determining, based on the second heuristic features, the number of malicious nodes connected to the second elastic computing instance, the number of non-malicious nodes connected to the second elastic computing instance, and the number of nodes connected to the second elastic computing instance and having unknown reputation scores, a second minimum value, a second maximum value, and a second average value, wherein the second minimum value, the second maximum value, and the second average value are based on second ratios of malicious nodes to non-malicious nodes wherein the feature vector further comprises the second minimum value, the second maximum value, and the second average value;

determining based on the feature vector, a fifth reputation score associated with the third FQDN; and communicating based on the fifth reputation score.

3. The method of claim 1, wherein the heuristic features comprise a first heuristic feature, a second heuristic feature, a third heuristic feature, and a fourth heuristic feature, wherein generating the first heuristic feature is based on the number of non-malicious nodes connected to the first elastic computing instance subtracted from the number of malicious nodes connected to the first elastic computing instance, multiplied by a hyper-parameter, and divided by the hyper-parameter multiplied by a sum of the number of non-malicious nodes connected to the first elastic computing instance and the number of malicious nodes connected to the first elastic computing instance, wherein generating the second heuristic feature is based on a logarithm of the number of non-malicious nodes connected to the first elastic computing instance subtracted from the number of malicious nodes connected to the first elastic computing instance, divided by a sum of the number of malicious nodes connected to the first elastic computing instance and the logarithm of the number of non-malicious nodes connected to the first elastic computing instance, wherein generating the third heuristic feature is based on a logarithm of the number of nodes connected to the first elastic computing instance and having unknown reputation scores subtracted from the number of non-malicious nodes connected to the first elastic computing instance subtracted from the number of malicious nodes connected to the first elastic computing instance, multiplied by the hyper-parameter, and divided by the hyper-parameter multiplied by a sum of the number of malicious nodes connected to the first elastic computing instance, the number of non-malicious nodes connected to the first elastic computing instance, and the logarithm of the number of nodes connected to the first elastic computing instance and having unknown reputation scores, and wherein generating the fourth heuristic feature is based on the logarithm of the number of nodes connected to the first elastic computing instance and having unknown reputation scores subtracted from the logarithm of the number of non-malicious nodes connected to the first elastic computing instance subtracted from the number of malicious nodes connected to the first elastic computing instance, divided by a sum of the number of malicious nodes connected to the first elastic computing instance, the logarithm of the number of non-malicious nodes connected to the first elastic computing instance, and the logarithm of the number of nodes connected to the first elastic computing instance and having unknown reputation scores.

4. The method of claim 1, wherein a fourth node of the nodes comprises a tuple of a second-level domain and a top-level domain, and wherein a fifth node of the nodes comprises an Internet Protocol (IP) address, the method further comprising:

determining a fifth reputation score associated with the tuple; and determining a sixth reputation score associated with the IP address.

5. A method for determining reputation scores of cloud-based environment entities, the method comprising:

determining, by at least one processor of a cloud-based environment, domain name service (DNS) data associated with entities of the cloud-based environment;

extracting, by the at least one processor, based on the DNS data, a k-partite graph comprising nodes and edges between the nodes, wherein the nodes comprise the entities, a first node of the nodes comprises a first elastic computing instance of the entities;

determining, by a machine learning model of the cloud-based environment, a number of malicious nodes connected to the first elastic computing instance, a number of non-malicious nodes connected to the first elastic computing instance, and a number of nodes connected to the first elastic computing instance, the number of nodes having unknown reputation scores;

generating, by the machine learning model, based on the number of malicious nodes connected to the first elastic computing instance, the number of non-malicious nodes connected to the first elastic computing instance, and the number of nodes connected to the first elastic computing instance and having unknown reputation scores, features associated with the first elastic computing instance;

determining, by the machine learning model, based on the features, a minimum value, a maximum value, and an average value, wherein the minimum value, the maximum value, and the average value are based on ratios of malicious nodes to non-malicious nodes;

generating, by the machine learning model, a feature vector comprising the minimum value, the maximum value, and the average value;

determining, by the machine learning model, based on the feature vector, a reputation score associated with the first elastic computing instance; and communicating, by the at least one processor, based on the reputation score.

6. The method of claim 5, further comprising:
determining flow log data; and
determining security certificates,
wherein extracting the k-partite graph is further based on the flow log data, and
wherein extracting the k-partite graph is further based on the security certificates.

7. The method of claim 5, wherein communicating based on the reputation score comprises approving or blocking communications with the first elastic computing instance.

8. The method of claim 5, wherein a second node of the nodes comprises a first fully qualified domain name (FQDN), and wherein a third node of the nodes comprises a second FQDN, the method further comprising:
determining, based on the feature vector, a second reputation score associated with the first FQDN;
determining, based on the feature vector, a third reputation score associated with the second FQDN; and
communicating at least one of the second reputation score or the third reputation score.

9. The method of claim 5, wherein a second node of the nodes comprises a first fully qualified domain name (FQDN), and wherein a third node of the nodes comprises a second FQDN, the method further comprising:
encoding a second reputation score associated with the first FQDN, the second reputation score indicative of the first FQDN being a malicious domain or a non-malicious domain; and
encoding a third reputation score associated with the second FQDN, the third reputation score indicative of the second FQDN being a malicious domain or a non-malicious domain,
wherein determining the number of malicious nodes connected to the first elastic computing instance, the number of non-malicious nodes connected to the first elastic computing instance, and the number of nodes connected to the first elastic computing instance and having unknown reputation scores is based on the second reputation score and the third reputation score.

10. The method of claim 5, wherein a second node of the nodes comprises a second elastic computing instance of the entities, and wherein a third node of the nodes comprises a fully qualified domain name (FQDN), the method further comprising:
determining, based on the FQDN, a number of malicious nodes connected to the second elastic computing instance, a number of non-malicious nodes connected to the second elastic computing instance, and a number of nodes connected to the second elastic computing instance, the number of nodes having unknown reputation scores;

generating, based on the number of malicious nodes connected to the second elastic computing instance, the number of non-malicious nodes connected to the second elastic computing instance, and the number of nodes connected to the second elastic computing instance and having unknown reputation scores, second heuristic features associated with the second elastic computing instance;

determining, based on the second heuristic features, the number of malicious nodes connected to the second elastic computing instance, the number of non-malicious nodes connected to the second elastic computing instance, and the number of nodes connected to the second elastic computing instance and having unknown reputation scores, a second minimum value, a second maximum value, and a second average value, wherein the second minimum value, the second maximum value, and the second average value are based on second ratios of malicious nodes to non-malicious nodes wherein the feature vector further comprises the second minimum value, the second maximum value, and the second average value;

determining based on the feature vector, a second reputation score associated with the FQDN; and
communicating based on the second reputation score.

11. The method of claim 5, wherein generating a first feature of the features is based on the number of non-malicious nodes connected to the first elastic computing instance subtracted from the number of malicious nodes connected to the first elastic computing instance, multiplied by a hyper-parameter, and divided by the hyper-parameter multiplied by a sum of the number of non-malicious nodes connected to the first elastic computing instance and the number of malicious nodes connected to the first elastic computing instance.

12. The method of claim 5, wherein generating a first feature of the features is based on a logarithm of the number of non-malicious nodes connected to the first elastic computing instance subtracted from the number of malicious nodes connected to the first elastic computing instance, divided by a sum of the number of malicious nodes connected to the first elastic computing instance and the logarithm of the number of non-malicious nodes connected to the first elastic computing instance.

13. The method of claim 5, wherein generating a first feature of the features is based on a logarithm of the number of nodes connected to the first elastic computing instance and having unknown reputation scores subtracted from the number of non-malicious nodes connected to the first elastic computing instance subtracted from the number of malicious nodes connected to the first elastic computing instance, multiplied by a hyper-parameter, and divided by the hyper-parameter multiplied by a sum of the number of malicious nodes connected to the first elastic computing instance, the number of non-malicious nodes connected to the first elastic computing instance, and the logarithm of the number of nodes connected to the first elastic computing instance and having unknown reputation scores.

14. The method of claim 5, wherein generating a first feature of the features is based on a logarithm of the number of nodes connected to the first elastic computing instance and having unknown reputation scores subtracted from a logarithm of the number of non-malicious nodes connected to the first elastic computing instance subtracted from the number of malicious nodes connected to the first elastic computing instance, divided by a sum of the number of malicious nodes connected to the first elastic computing instance, the logarithm of the number of non-malicious nodes connected to the first elastic computing instance, and the logarithm of the number of nodes connected to the first elastic computing instance and having unknown reputation scores.

15. The method of claim 5, wherein a second node of the nodes comprises a tuple of a second-level domain and a top-level domain, wherein a third node of the nodes comprises an Internet Protocol (IP) address, the method further comprising:
determining a second reputation score associated with the tuple; and
determining a third reputation score associated with the IP address.

16. The method of claim 5, the method further comprising:
determining additional quantitative values associated with the entities, wherein the feature vector further comprises the additional quantitative values.

17. A system for determining reputation scores of cloud-based environment entities, the system comprising memory coupled to at least one processor of a cloud-based environment, the at least one processor configured to:
determine domain name service (DNS) data associated with entities of the cloud-based environment;
extract, based on the DNS data, a k-partite graph comprising nodes and edges between the nodes, wherein the nodes comprise the entities, a first node of the nodes comprises a first elastic computing instance of the entities;
determine, using a machine learning model of the cloud-based environment, a number of malicious nodes connected to the first elastic computing instance, a number of non-malicious nodes connected to the first elastic computing instance, and a number of nodes connected to the first elastic computing instance, the number of nodes having unknown reputation scores;
generate, using the machine learning model, based on the number of malicious nodes connected to the first elastic computing instance, the number of non-malicious nodes connected to the first elastic computing instance, and the number of nodes connected to the first elastic computing instance and having unknown reputation scores, features associated with the first elastic computing instance;
determine, using the machine learning model, based on the features, a minimum value, a maximum value, and an average value, wherein the minimum value, the maximum value, and the average value are based on ratios of malicious nodes to non-malicious nodes;
generate, using the machine learning model, a feature vector comprising the minimum value, the maximum value, and the average value;
determine, using the machine learning model, based on the feature vector, a reputation score associated with the first elastic computing instance; and
communicate based on the reputation score.

18. The system of claim 17, wherein the at least one processor is further configured to determine flow log data, wherein to extract the k-partite graph is further based on the flow log data.

19. The system of claim 17, wherein the at least one processor is further configured to determine security certificates,
wherein to extract the k-partite graph is further based on the security certificates.

20. The system of claim 17, wherein a second node of the nodes comprises a first fully qualified domain name (FQDN), wherein a third node of the nodes comprises a second FQDN, and wherein the at least one processor is further configured to:
determine, based on the feature vector, a second reputation score associated with the first FQDN;
determine, based on the feature vector, a third reputation score associated with the second FQDN; and
communicate based on at least one of the second reputation score or the third reputation score.

* * * * *